Oct. 24, 1961  P. W. NELSON  3,005,344
REMOTE INDEX APPARATUS FOR A GAS METER
Filed July 2, 1958
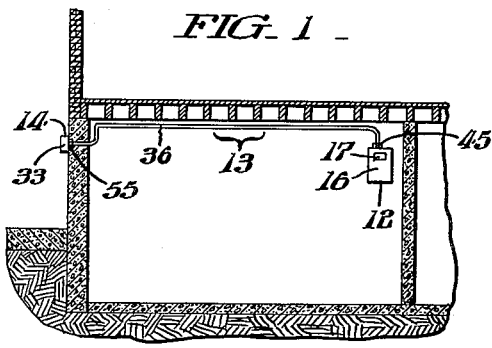
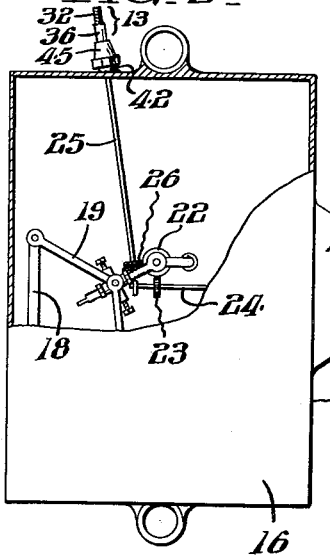
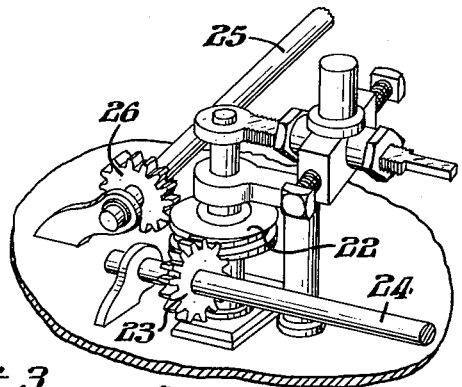
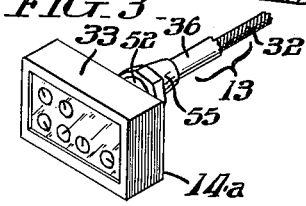
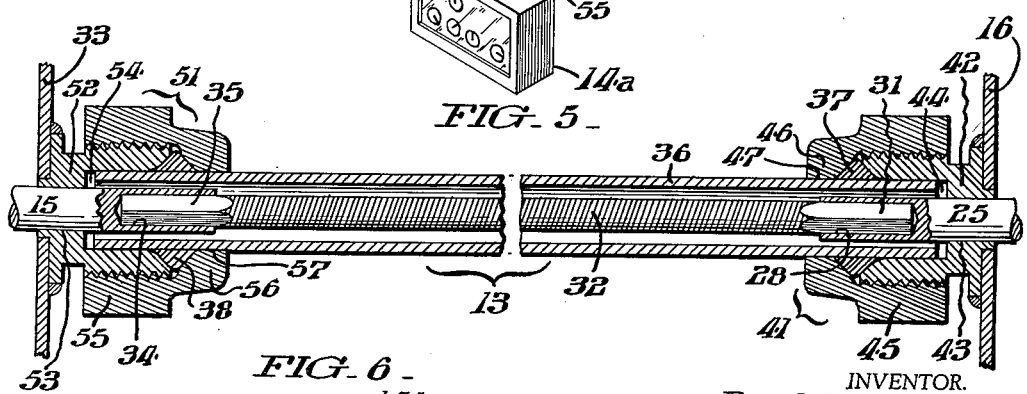
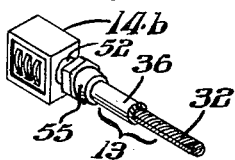
INVENTOR.
*Paul W. Nelson,*
BY *Paul & Paul*
ATTORNEYS.

United States Patent Office 3,005,344
Patented Oct. 24, 1961

3,005,344
REMOTE INDEX APPARATUS FOR A
GAS METER
Paul W. Nelson, 62 Mildred Lane, Chester, Pa.
Filed July 2, 1958, Ser. No. 746,121
2 Claims. (Cl. 73—272)

This invention relates to a remote reading index for a gas meter, and more particularly relates to a remote index apparatus for a gas meter which may be installed at any location remote from the gas meter for easy reading by a meter reader. For example, the invention has particular utility in connection with private residences and other buildings where the meter itself is located inside the building and often cannot be read without gaining access to the building.

It would be advantageous to install gas meters on the exteriors of residences and other buildings so that they may be read from outside. This would eliminate a source of inconvenience to the customer of the gas company, in that it would not be necessary for the meter reader to enter the building to read the meter as is now generally the case, and it would also reduce the cost of reading these meters since the time required by the meter reader to read the meters would be reduced. This reduction in the meter reader's time is especially important in cases where the customer is not at home, since expensive call-backs would not be necessary.

Positioning of electric meters on the outside of the residence is now accepted practice. Exterior installation of gas meters, however, has not yet been found feasible, principally because of cost, size, etc.

Accordingly the industry is therefore still faced with the expense of extra calls by the meter reader when he is unable to gain access to the residence at the time of the scheduled gas meter reading.

It has heretofore been proposed to install, as an accessory to a gas meter, an index located outside the building. Previously proposed remote index apparatus driven by flexible shaft extensions had the disadvantage of being subject to corrosion, and had further presented problems of high maintenance cost, complicated construction and oxidation of lubricants on moving parts. Further, the conventional gas meter is sealed and connected to the gas main. Since its contains gas under pressure, the prior art flexible shaft extensions had packing glands or the like to prevent gas leakage adjacent the flexible shaft connection into the meter. This construction presented the possible hazard of gas leakage into the residence as the packing dried or wore out. Moreover, under present gas utility practice, glands for moving parts under gas pressure are generally unacceptable.

It is an object of this invention to overcome the foregoing problems and disadvantages. It is another object of this invention to provide an inexpensive remote index apparatus for a gas meter which is simple in construction and which is easily and inexpensively maintained.

It is another object of this invention to provide a remote index apparatus for a gas meter, which is highly accurate and which is free of leakage problems, tendency to overload and bind.

It is another object of this invention to provide a remote reading apparatus driven by a flexible shaft from a gas meter, in which there is a minimum of friction in the flexible shaft system and its connections to the remote reading member and the gas meter.

It is another object of this invention to provide remote index apparatus which is completely sealed and resists corrosion even when exposed to the weather and subjected to the extremes of ambient temperature. Another object is to provide such an apparatus which has lubricated parts, and which protects the lubricants against oxidation.

Other objects and advantages of this invention, including the simplicity and economy of the same and the ease with which it may be applied to existing equipment, will further become apparent hereinafter and in the drawings, in which:

FIG. 1 is a sectional view of a building, showing a remote index apparatus constructed and installed in accordance with a preferred form of this invention;

FIG. 2 is an enlarged view in plan of a gas meter into which the remote reading index according to this invention may be installed, part of the top being broken away;

FIG. 3 is a perspective view of a remote index adapted for connection to the gas meter;

FIG. 4 is a view in perspective of a portion of one specific form of the interior mechanism of a gas meter, illustrating how the remote reading index is actuated from the gas meter;

FIG. 5 is a view in section of a flexible shaft extension which forms an element of this invention; and FIG. 6 is a view in perspective of a cyclometer type of remote index, comprising an alternate form which may be substituted for the form shown in FIG. 3.

In describing the preferred embodiment of the invention illustrated in the drawings, specific terminology will be resorted to for the sake of clarity. However, it is not intended to be limited to the specific term so selected, and it is to be understood that each specific term includes all technical equivalents which operate in a similar manner to accomplish a similar result.

Turning now to the specific embodiment of the invention selected for illustration in the drawings, the overall arrangement of a remote index apparatus is shown, including a gas meter 12, a flexible shaft extension 13 and a gas-tight permanently lubricated remote index 14. The extension 13 is connected to the meter 12 inside the building and extends to the remote index 14 outside the building.

Remote index 14 may be of the dial type with pointers, as shown in FIG. 3 and designated 14a, or it may be of the cyclometer type designated 14b as shown in FIG. 6.

In any case, remote index 14 is provided (FIG. 5) with a driven shaft 15 which operates the mechanism within remote index 14.

In the specific form of the invention shown in the drawings, gas meter 12 is of the Glover type, but any other type gas meter may be used. Gas meter 12 is provided with mechanism for measuring the flow of gas which is enclosed within a housing 16 and read from a regular gas meter index 17. The measuring mechanism comprises bellows (not shown) which operate flag arms 18 and 19 to drive worm 22 in a well known manner. Worm 22 drives gear 23 to rotate index drive shaft 24 which operates the regular gas meter index 17.

Within housing 16 of gas meter 12 there is provided another drive shaft 25 which is rotated by worm 22 through gear 26. The outer end of drive shaft 25 extends through housing 16 and is provided with a recess 28. Recess 28 is preferably square in cross-section and it receives and end fitting 31 of a flexible shaft 32. Similarly, a driven shaft 15 extends through gas-tight remote index housing 33 and is provided at its outer end with a recess 34 which receives end fitting 35 of flexible shaft 32. Flexible shaft extension 13 is provided with a flexible, gas-tight casing 36 which is preferably of copper or aluminum tubing and casing 36 is provided at its ends with ferrules 37, 38.

The flexible shaft 32 is lubricated for easy rotation within casing 36, and of course the moving parts in gas meter 12 and remote index 14 are also suitably lubricated.

Flexible shaft extension 13 includes a connector 41 which has a threaded stud 42 soldered or welded to gas meter housing 16 and is provided with a bore 43 which provides a bearing surface for shaft 25 and with a recess 44 for receiving the end of casing 36. Also provided is a threaded end cap 45 having a flange 46 with an opening 47 for receiving casing 36. As is shown in FIG. 5 flange 46 of end cap 45 engages ferrule 37 and compresses it against stud 42 and the casing 36 to couple the said casing to gas meter 12 with a gas-tight connection.

At remote index 14, there is provided a connector 51 which includes a threaded stud 52 soldered or welded to housing 33 which has a bore 53 to provide a bearing surface for shaft 15 and a recess 54 for receiving the end of casing 36. An end cap 55 having a flange 56 and an opening 57 for receiving the end of casing 36 threadedly engages the stud 52. As shown in FIG. 5, a ferrule 38 surrounding casing 36 is clamped between flange 56 of end cap 55 and stud 52 and is compressed against the casing 36 to provide a gas-tight coupling between said casing and the gas-tight remote index 14.

The gas meter housing 16, the remote index housing 33 and the casing 36 are thus intercommunicating and gas tight so that when gas is supplied to the meter 12, these parts are filled with gas at the same pressure as in the gallery or top part of the meter.

Since remote index apparatus 14 and casing 33 are gas tight, there is no possibility of gas escaping within the residence. It has been found that flexible shaft extension 13 can extend for a distance of at least 50 feet with insignificant increase in friction load on the meter due to the remote apparatus and flexible shaft, and without any impairment of meter accuracy. A remote index apparatus of the type shown in FIG. 3, including a flexible shaft extension 13 having a length of 50 feet has successfully withstood accelerated tests equivalent to 50 years of service.

Operation

In operation the worm 22 is rotated by the measuring mechanism of gas meter 12, and the rotation of worm 22 drives the drive shaft 25 through gear 26. Drive shaft 25 rotates the flexible shaft 32 which in turn rotates the driven shaft 15 located in the remote index 14. Driven shaft 15 operates the remote indicating apparatus. Remote index 14 is positioned outside of the residence and may be read very easily by the meter reader, without the necessity of the meter reader entering the residence as has previously been the usual case.

It will be appreciated, accordingly, that it is an advantageous feature of this invention that there can be no loss or escape of gas through possible drying out of gaskets or deterioration of seals in stuffing boxes or other means which have been utilized in the prior art. On the contrary, in accordance with applicant's invention, the gas is sealed against leakage by means of seals which join together the remote index housing, the casing, and the gas meter housing itself.

Another important and advantageous feature of this invention resides in the fact that no substantial frictional loads are present between the gas meter and the remote index. While devices of the prior art have utilized tight glands or stuffing boxes which create substantial fractional loads, the combination according to this invention has a substantial degree of freedom in action and sets up no frictional loads which would otherwise interfere with the accuracy of the remote reading.

It will further be appreciated that, in accordance with this invention, no substantial amount of oxidation of lubricant in the system can take place. Any oxygen which is initially present in the gas which is contained within the casing and the remote index housing can, of course, initially react with lubricant which is contained within these parts, but the total amount of oxygen is exceedingly small. After such oxygen is used up in causing oxidation of a very small quantity of lubricant, the remaining gas is essentially stagnant and free of oxygen, thereby effectively preventing any substantial oxidation of any lubricant which is present in the system.

While the preferred embodiment of this invention has been described in some detail, it will be obvious to one skilled in the art that various modifications may be made without departing from the invention as hereinafter claimed. For example, various changes may be made in the shape, size, and arrangement of parts, equivalent elements may be substituted for those illustrated and described herein, parts may be reversed, and certain features of the invention may be utilized independently of the use of other features, all without departing from the spirit and scope of the invention as defined in the subjoined claims.

Having thus described my invention, I claim:

1. In a combination with a gas meter having a sealed housing containing gas to be metered which is of essentially non-oxidizing and corrosion inhibiting character under pressure, a remote index located at a distance from said gas meter housing and including a remote index sealed housing containing lubricated parts; flexible shaft means connected between the remote index housing and the gas meter housing for conveying intelligence from said gas meter to said remote index; a sealed casing surrounding said flexible shaft means and extending between said remote index housing and said gas meter housing, said casing having fluid communication with both of said housings; and gas-tight connector means connecting the casing to the remote index housing and to the gas meter housing, the interior of said casing and said remote housing being filled with said gas under the same pressure as in said gas meter housing, whereby the parts within said remote housing are inhibited against corrosion and the lubricant is protected against oxidation.

2. In combination with a gas meter having a sealed housing containing gas to be metered which is of essentially non-oxidizing and corrosion inhibiting character under pressure, a remote index located at a distance from said gas meter housing and including a remote index sealed housing containing lubricated parts; a drive shaft positioned within the housing of the gas meter and operated by the gas meter to drive the remote index; a driven shaft positioned within the housing of the remote index; a flexible shaft connected at one end to said drive shaft and at the other end to said driven shaft; a sealed casing surrounding said flexible shaft; said gas in stagnant condition being contained within the remote index housing and the casing; connector means connected between the gas meter housing and an end of said casing providing a bearing for said drive shaft and a gas-tight communicating coupling between the gas meter housing and the casing; and connector means connected between the remote index housing and the other end of said casing providing a bearing for said driven shaft and a gas-tight communicating coupling between the remote index housing and the casing, said gas in the interior of said casing and said remote housing being under the same pressure as in said gas meter housing, whereby the parts within said remote housing are always immersed in said stagnant gas and are thus inhibited against corrosion and the lubricant is protected against oxidation.

References Cited in the file of this patent

UNITED STATES PATENTS

| | | |
|---|---|---|
| 1,432,157 | Cox | Oct. 17, 1922 |
| 1,495,010 | Ford | May 20, 1924 |
| 1,744,110 | Dunbaugh | Jan. 21, 1930 |
| 1,963,330 | Lumme | June 19, 1934 |
| 2,094,711 | Leininger | Oct. 5, 1937 |
| 2,630,714 | Zimmerman | Mar. 10, 1953 |